Patented Apr. 13, 1943

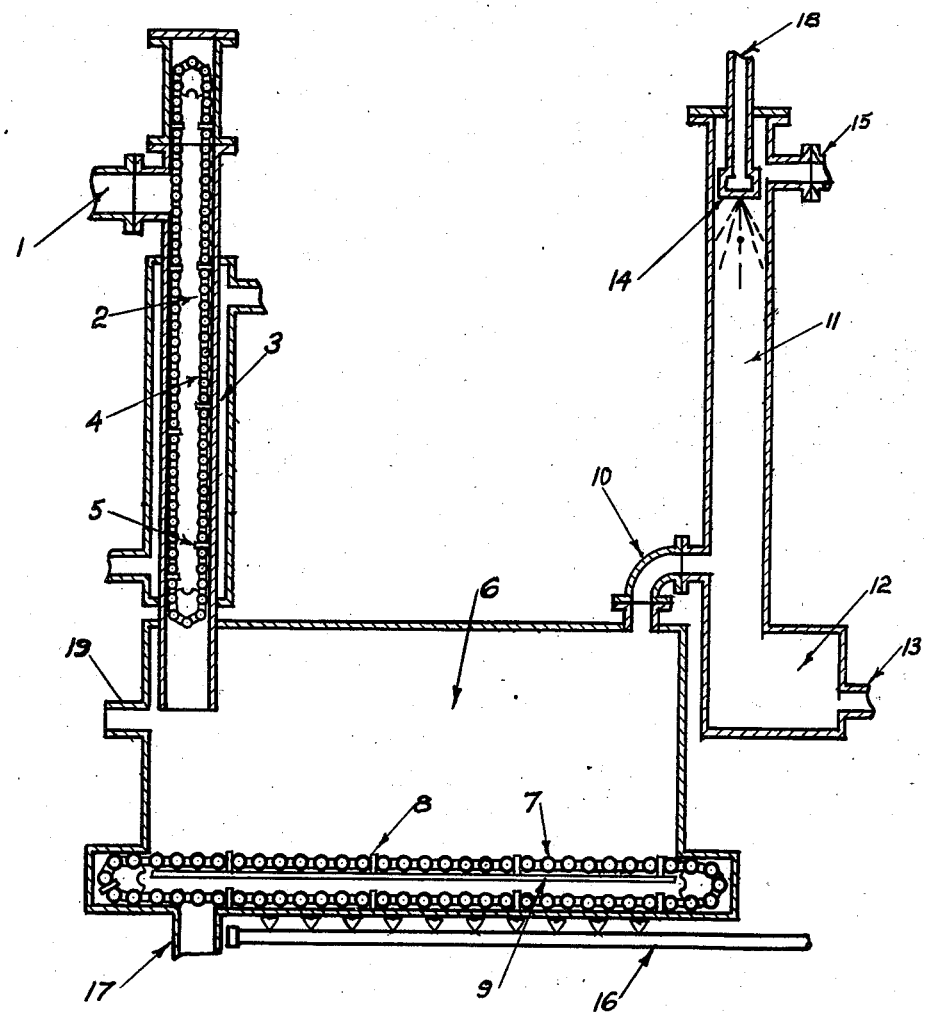

2,316,275

UNITED STATES PATENT OFFICE 2,316,275

CHLORINATION OF METAL BEARING MATERIALS

Irving E. Muskat and Robert H. Taylor, Akron, Ohio, assignors to Pittsburgh Plate Glass Company, Allegheny County, Pa., a corporation of Pennsylvania Application March 15, 1941, Serial No. 383,578

21 Claims. (Cl. 75—111)

This invention relates to the chlorination of metal bearing materials containing metals forming normally solid and liquid chlorides. The invention is particularly related to the treatment of iron tin ores wherein the chlorination may be conducted in a manner such that a mixture of iron and tin chlorides is formed and volatilized. When it is attempted to recover these chlorides from the vapor thus formed by means of fractional condensation, difficulty is encountered since plugging of the condenser system often occurs within a short time after the process has been initiated.

In accordance with our invention, we have provided a method of recovering the iron and tin chlorides without the plugging difficulties which have been encountered in prior art processes. The invention is particularly applicable to the treatment of vapors produced by the chlorination of ores containing upward of 10 percent of tin and upward of 5 percent of iron, and is particularly applicable to the treatment of ores containing a substantial amount of iron and in excess of 10 percent tin. The chlorination may be conducted in any suitable manner but is preferably carried out by the process described in an application of Irving E. Muskat, Serial No. 371,977, filed December 27, 1940.

In accordance with this process, the chlorination may be conducted without recourse to an externally heated reactor and the plugging may be substantially eliminated. The chlorination may be conducted in the presence of the required amount of a reducing agent such as carbon, if desired, or in the absence of a reducing agent, with the consequent production of vapors of iron chloride and tin tetrachloride. These vapors may be condensed and chlorides therein separated as hereinafter described. It has been found that if the chlorination is conducted at a temperature not less than 600° C. and preferably above 700° C., the reaction proceeds with such rapidity that the heat evolved by the reaction is sufficient to maintain reaction temperature without externally heating the reactor. Thus, by regulating the rate of introduction of ore, carbon, and chlorine into the reactor, it is possible to maintain the temperature therein. In order to achieve optimum efficiency and yield, the temperature should be maintained above 700° C., maximum efficiency being secured at 850–1250° C. Thus, when tin ore or other tin containing material is chlorinated at a temperature of about 700° C. or above, the temperature of reaction may be maintained through careful periodical observation of temperature and regulation of the rate of introduction of chlorine, ore, and carbon. In such a case, it is found possible to secure a good utilization of the chlorine introduced and to secure chlorination of the major portion of the ore without difficulty. When the temperature is maintained at 850–1250° C., maintenance of temperature within the reactor is considerably easier and less adjustment of the rate of addition of ore, carbon, and chlorine is required.

The vapors produced by this process comprise a mixture of iron and tin chlorides, wherein the iron chloride concentration generally exceeds 15 to 25 percent by weight of tin chloride in the vapors. In general, it is difficult to secure satisfactory separation of the iron chloride by fractionally condensing iron and tin tetrachloride since iron chloride often distributes itself throughout the condenser system, plugging the system to such an extent that it must be cleaned at frequent intervals. In order to avoid this plugging, the major portion of the iron chloride is condensed shortly after it is withdrawn from the furnace. In order to insure removal of iron chlorides to such an extent that the possibility of plugging during subsequent condensation processes is minimized, it is found desirable to condense out at least a substantial portion, generally not less than about 15–20 percent of the tin tetrachloride together with the iron chloride. Any residual tin tetrachloride vapor may then be condensed without fear of plugging the condenser system.

We have found that when a fractional condensation of iron chloride is attempted, a large portion of the iron chloride remains dispersed in the uncondensed gases in the form of a finely divided smoke or solid suspension. When a substantial portion of tin tetrachloride is condensed with the ferric chloride, however, the condensed liquid tetrachloride bathes the gases and assists separation of the solid iron chloride therefrom. The mixture of chlorides so condensed may then be heated to recover the tin tetrachloride. In order to improve the separation of iron and tin chlorides after condensation, it may be desirable to heat the condensed mixture in the presence of a gaseous diluent. The gaseous mixture which remains after condensation of iron chloride and part of the tin tetrachloride is found to be particularly suitable for a diluent since it is substantially free from oxygen or other agents which would promote decomposition of the iron chloride.

This process is particularly applicable to the treatment of vapors containing a large amount of iron chloride whereby iron and tin chlorides are condensed, a condensate which is solid or at least in the form of a thick fluid pulp is obtained. This mixture thus obtained contains a substantial quantity of iron chloride, the concentration generally being in excess of 20 percent by weight of the total mixture. Since such mixtures ordinarily cannot be filtered, the tin tetrachloride is generally removed by heating the mixture to revaporize the tin tetrachloride. To insure efficient vaporization of the tetrachloride, this treatment preferably should be conducted by heating the chlorides to a temperature of 100–250° C. in the presence of a gaseous diluent such as nitrogen, chlorine, carbon dioxide, etc., in order to increase the volatility of the tin tetrachloride. This process has been conducted most efficiently by transferring the condensed mixture of chlorides by scrapers or other suitable means to another portion of the condenser system and vaporizing the tetrachloride in the mixture in the presence of the mixture of gases which may contain chlorine, carbon dioxide, and vaporized tin tetrachloride from which condensed chlorides were obtained initially. This may be done, for example, by preliminarily heating this gaseous mixture and contacting the condensed mixture of chlorides with the heated gases.

The accompanying drawing diagrammatically illustrates a suitable apparatus for conducting the process in accordance with our invention. The apparatus comprises a pair of condensers 2 and 11, which may be air cooled or may be cooled by water, as will be understood in the art. In the normal operation of this device, ore or other tin bearing material is chlorinated in a suitable furnace such as shown in our Patent No. 2,184,887, or application Serial No. 371,977, referred to above, or other suitable furnace and vapors of iron and tin chloride are formed. These vapors are introduced through inlet conduit 1, into condenser 2, which may be provided with a water jacket 3, where they are cooled to a temperature sufficiently low, for example, below 40° C., whereby the major portion of the iron chloride and a large quantity of tin tetrachloride are condensed and collected as a slush in chamber 6, at the base of condenser 1. Clogging of the condenser is prevented by means of a traveling chain 4, upon which are mounted scrapers 5. The chlorides are conveyed by these scrapers or by gravity to chamber 6, being discharged upon a floor 9. This condensate is then conveyed along the floor by means of scrapers 8, which are mounted upon a traveling chain 7, and are thus moved toward the end of the chamber. A portion of the chamber is heated by a suitable means 16, to the temperature required to permit vaporization of tin tetrachloride, for example, 100 to 250° C. This vaporization is assisted by contact of the diluent gases escaping from the bottom of condenser 2, which pass over the condensate and thereby bathe the condensed chlorides. This process permits revaporization of any condensed titanium tetrachloride and insures production of ferric chloride in a highly purified state.

The ferric chloride, after vaporization of titanium tetrachloride, is discharged to the bottom of chamber 6, and finally is conveyed to a ferric chloride outlet 17, by scrapers 8. The vapors passing from chamber 6 enter tin tetrachloride spray condenser 11, through conduit 10, where they are sprayed with a liquid halide such as tin tetrachloride which is supplied to sprayhead 14, through supply line 18. The vapors are thus washed to remove suspended iron chloride and a portion or all of the tin tetrachloride is condensed and collected in reservoir 12. The exhaust gases are removed through outlet 15, and may be subjected to further condensing operations for recovery of uncondensed tin tetrachloride. Tin tetrachloride may be withdrawn periodically through outlet 13. In order to assist in the revaporization of tin tetrachloride, a gaseous diluent such as carbon dioxide, nitrogen, etc. may be introduced through inlet 19, into chamber 6. If desired, the gases passing through chamber 6 may be sprayed with a liquid halide such as tin, titanium, carbon or silicon tetrachloride, by means of suitable sprays (not shown) in order to insure complete removal of the iron chloride from the system. This liquid may be revaporized with the previously condensed tin tetrachloride and recovered in subsequent operations.

The following example illustrates the invention:

Using a shaft furnace having an internal diameter of 15 inches which was preheated to a temperature of 1000° C., briquettes, prepared from a mixture of 100 parts ore, 5 parts carbon and 14 parts molasses, were introduced at a rate of 120 pounds per hour and chlorine at 1.4 to 1.7 pounds per minute. The temperature remained at 850–1000° C. throughout the run without externally heating the furnace. The vapors were withdrawn from the furnace and cooled to 40° C. in condenser 2 whereupon substantially all of the ferric chloride and approximately 25 percent of the tin tetrachloride were simultaneously condensed. The condensed chlorides were transferred to floor 9 of the condenser where the tin tetrachloride was revolatilized by heating while passing the exhaust gases of the furnace over the condensed chlorides. The ore used was an oxide tin ore containing 36 percent tin and 17 percent iron. No plugging of the condenser system occurred during the run. The process was carried on continuously for many hours by introducing briquettes at a rate of 120 pounds per hour and chlorine at a rate of 1.4 to 1.7 pounds per minute. The treated residue was withdrawn at a rate required to keep the ore in the furnace at a constant level.

While the invention has been described with particular reference to the treatment of iron tin bearing materials, it is not so limited since it may be applied to other materials which upon halogenation form vapors of a normally solid and a normally liquid halide such as iron-titanium, iron-silicon, iron-vanadium, aluminum-titanium, or aluminum-silicon bearing materials. Thus, titanium ores may be treated as described in our copending application Serial No. 333,361, filed May 4, 1940. In each case the normally solid chloride is condensed with a portion of the normally liquid chloride as herein described.

Although the present invention has been described with reference to specific details of certain embodiments thereof, it is not intended that such details shall be regarded as limitations upon the scope of the invention except insofar as included in the accompanying claims.

This application is a continuation-in-part of our copending allowed application Serial No. 333,361, filed May 4, 1940, which in turn is a continuation-in-part of application Serial No. 282,199, filed June 30, 1939.

We claim:

1. In the chlorination of a tin bearing material which contains a quantity of iron of such magnitude that upon chlorination of said material, the amount of iron chloride formed is such as to cause plugging of the condenser system, the process which comprises chlorinating the material at a temperature sufficiently high to volatilize iron chloride and tin tetrachloride to form a vapor mixture containing a large quantity of both iron and tin chlorides, initially condensing the major portion of the iron chloride from the vapor mixture together with a quantity of tin tetrachloride in an amount sufficient to insure the elimination of a major portion of the condensed iron chloride from the vapor mixture and thus to minimize the tendency toward plugging of the system and separately condensing a further quantity of tin chloride from the vapor mixture.

2. In the chlorination of a tin bearing material which contains a quantity of iron of such magnitude that upon chlorination of said material, the amount of iron chloride formed is such as to cause plugging of the condenser system, the process which comprises chlorinating the material at a temperature sufficiently high to volatilize iron chloride and tin tetrachloride to form a vapor mixture containing a large quantity of both iron and tin chlorides, initially condensing the major portion of the iron chloride from the vapor mixture together with a quantity of tin tetrachloride in an amount sufficient to insure the elimination of a major portion of the condensed iron chloride from the vapor mixture and thus to minimize the tendency toward plugging of the system and heating the resulting condensed mixture in the presence of a gaseous diluent to vaporize tin tetrachloride from the iron chloride.

3. In the chlorination of a tin bearing material which contains a quantity of iron of such magnitude that upon chlorination of said material, the amount of iron chloride formed is such as to cause plugging of the condenser system, the process which comprises chlorinating the material at a temperature sufficiently high to volatilize iron chloride and tin tetrachloride to form a vapor mixture containing a large quantity of both iron and tin chlorides, initially condensing the major portion of the iron chloride from the vapor mixture together with a quantity of tin tetrachloride in an amount sufficient to insure the elimination of a major portion of the condensed iron chloride from the vapor mixture and thus to minimize the tendency toward plugging of the system and heating the resulting condensed mixture in the presence of a portion of the uncondensed vapor to volatilize tin tetrachloride.

4. In the chlorination of a tin bearing material which contains a quantity of iron of such magnitude that upon chlorination of said material, the amount of iron chloride formed is such as to cause plugging of the condenser system, the process which comprises chlorinating the materials at a temperature sufficiently high to volatilize iron chloride and tin chloride to form a vapor mixture thereof containing a large quantity of both iron and tin chlorides, initially condensing the major portion of the iron chloride from the vapor mixture together with a quantity of tin tetrachloride in an amount sufficient to insure the elimination of a major portion of the condensed iron chloride and thus to minimize the tendency toward plugging of the system and heating the resulting condensed mixture in the presence of gaseous chlorine to vaporize the tin tetrachloride from the iron chloride.

5. In the chlorination of a tin oxide bearing material containing in excess of 10 percent of tin and in excess of 5 percent of iron the process which comprises chlorinating the material at a temperature sufficiently high to volatilize iron chloride and tin tetrachloride to form a vapor mixture thereof, condensing a substantial portion of the iron chloride to form a vapor mixture together with a quantity of tin tetrachloride in an amount sufficient to insure the elimination of a substantial portion of the condensed iron chloride from the vapor mixture and thus to minimize the tendency toward plugging of the system and separately condensing a further quantity of tin chloride from the vapor.

6. In the chlorination of a tin bearing material containing a substantial quantity of tin and iron, the process which comprises chlorinating the material at a temperature sufficiently high to volatilize iron chloride and tin tetrachloride to form a vapor mixture thereof, condensing the major portion of the iron chloride from the vapor mixture together with at least 15 percent of tin tetrachloride whereby the elimination of the major portion of the condensed iron chloride from the vapor mixture is insured and the tendency toward plugging of the system is minimized, and heating the resulting condensed mixture in the presence of a diluent at a low temperature to vaporize tin tetrachloride from the iron chloride.

7. A method of separating iron and tin chloride from a vapor mixture containing substantial quantities of both chlorides which comprises condensing a substantial portion of the iron chlorides from the vapor mixture together with a quantity of tin tetrachloride in an amount sufficient to insure the elimination of a substantial portion of the condensed iron chloride from the vapor mixture and thus to minimize the tendency toward plugging of the system and separately condensing a further portion of the tin tetrachloride.

8. A method of separating iron and tin chlorides from a vapor mixture containing substantial quantities of both chlorides which comprises condensing a substantial portion of the iron chloride from the vapor mixture together with a quantity of tin tetrachloride in an amount sufficient to insure the elimination of a substantial portion of the condensed iron chloride from the vapor mixture and thus to minimize the tendency toward plugging of the system, and heating the condensed mixture to vaporize the tin tetrachloride from the iron chloride.

9. A method of separating iron and tin chlorides from a vapor mixture containing substantial quantities of both chlorides which comprises condensing the major portion of the iron chloride from the vapor mixture together with a quantity of tin tetrachloride in an amount sufficient to insure the elimination of a major portion of the condensed iron chloride from the vapor mixture and thus to minimize the tendency toward plugging of the system, spraying the residual vapor mixture with liquid tin tetrachloride to assist elimination of suspended solids therefrom and heating the condensed mixture to vaporize the tin tetrachloride from the iron chloride.

10. A method of separating iron and tin chlorides from a vapor mixture containing substantial quantities of both chlorides which comprises condensing the major portion of the iron chloride from the vapor mixture together with a quantity of tin tetrachloride in an amount sufficient to insure the elimination of a major portion of the condensed iron chloride from the vapor mixture and thus to minimize the tendency toward plugging of the system and spraying the residual vapor mixture with liquid halide to assist elimination of suspended solids therefrom and heating the condensed mixture to vaporize the tin tetrachloride from the iron chloride.

11. A method of separating tin and iron chlorides from a vapor mixture containing substantial quantities of both chlorides which comprises condensing the major portion of the iron chloride from the vapor mixture together with a quantity of tin tetrachloride in an amount sufficient to insure the elimination of a major portion of the condensed iron chloride from the vapor mixture and thus to minimize the tendency toward plugging of the system, spraying the residual vapor mixture and the condensed solids with liquid halide to assist the elimination of solid iron chloride therefrom and heating the condensed mixture to vaporize the tin tetrachloride from the iron chloride.

12. A method of separating iron and tin chlorides from a vapor mixture thereof which comprises introducing said mixture into one portion of a condenser, condensing a substantial portion of the iron chloride from the vapor mixture together with at least a portion of tin chloride, moving the condensate from the point of condensation to a zone of higher temperature within said condenser and heating said zone to vaporize tin chloride.

13. A method of separating iron and tin chlorides from a vapor mixture thereof which comprises introducing said mixture into one portion of a condenser, condensing the major portion of the iron chloride from the vapor mixture together with at least a portion of tin chloride, moving the condensate from the point of condensation to a zone of higher temperature within said condenser, heating said zone to vaporize tin chloride and passing the uncondensed portion of the mixture over the condensate to assist in such vaporization.

14. A method of chlorinating a metal bearing material which contains a metal capable of forming normally solid chloride and a metal capable of forming a normally liquid chloride which comprises chlorinating the material at a temperature sufficient to form a vaporized mixture containing a substantial quantity of both of said chlorides, initially condensing the major portion of the vaporized normally solid chloride together with a quantity of the vaporized normally liquid chloride in amount sufficient to insure elimination of a major portion of said solid chloride from the vapor mixture and thus to minimize the tendency toward plugging of the system and separately condensing a further portion of the vaporized normally liquid chloride.

15. A method of chlorinating a metal bearing material which contains a metal capable of forming a normally solid chloride and a metal capable of forming a normally liquid chloride which comprises chlorinating the material at a temperature sufficient to form a vaporized mixture containing a substantial quantity of both of said chlorides, initially condensing the major portion of the vaporized normally solid chloride together with a quantity of the vaporized normally liquid chloride in amount sufficient to insure elimination of a major portion of said solid chloride from the vapor mixture and thus to minimize the tendency toward plugging of the system and heating the resulting condensed mixture in the presence of a gaseous diluent to vaporize said liquid chloride.

16. A method of treating a vaporized mixture containing a normally liquid and a normally solid metallic chloride which comprises condensing the major portion of the vaporized solid chloride together with a quantity of said vaporized liquid chloride sufficient to insure the elimination of a major portion of the condensed solid chloride from the vapor mixture and separately condensing a further portion of the liquid chloride.

17. A method of treating a vaporized mixture containing a normally liquid and a normally solid metallic chloride which comprises condensing the major portion of the vaporized solid chloride together with a quantity of said vaporized liquid chloride sufficient to insure the elimination of a major portion of the condensed solid chloride from the vapor mixture, spraying the residual vapor with liquid halide to assist in removal of suspended solids therefrom and heating the condensed mixture to vaporize the liquid chloride.

18. A method of treating a vaporized mixture containing a vaporized normally liquid metallic chloride and a vaporized normally solid metallic chloride which comprises introducing the mixture into one portion of a condenser, condensing a substantial portion of the solid chloride from the vapor mixture together with at least a portion of the vaporized liquid halide, moving the condensate to a zone of higher temperature within the condenser and heating said zone to vaporize the liquid chloride.

19. A method of treating a vaporized mixture containing a vaporized normally liquid metallic chloride and a vaporized normally solid metallic chloride which comprises introducing the mixture into one portion of a condenser, condensing the major portion of the solid chloride from the vapor mixture together with at least a portion of the vaporized liquid chloride, moving the condensate to a zone of higher temperature within the condenser, heating said zone to vaporize the liquid chloride and passing the uncondensed portion of the mixture over the condensate to assist in such vaporization.

20. A method of chlorinating a metal bearing material which contains a metal capable of forming a normally solid halide and a metal capable of forming a normally liquid halide which comprises chlorinating the material at a temperature sufficient to form a vaporized mixture containing a substantial quantity of said halides, initially condensing the major portion of the vaporized normally solid halide together with a quantity of the vaporized normally liquid halide in amount sufficient to insure elimination of a major portion of said solid halide from the vapor mixture and thus to minimize the tendency toward plugging of the system and separately condensing a further portion of the vaporized normally liquid halide.

21. A method which comprises chlorinating a metal bearing material which contains a substantial quantity of a metal capable of forming a normally solid chloride and a substantial quantity of a metal capable of forming a normally liquid chloride at a temperature sufficient to form a vaporized mixture containing a substantial quantity of said chloride, condensing the solid chloride together with a substantial portion of the liquid chloride while retaining at least a portion of the normally liquid chloride in vapor state and moving the solid chloride in a direction concurrent with the direction the vapors from which the solid chloride was condensed are passed whereby the solid chloride is bathed with such vapors.

IRVING E. MUSKAT.
ROBERT H. TAYLOR.